United States Patent [19]

Fujishiro

[11] 4,269,157

[45] May 26, 1981

[54] FUEL INJECTION SYSTEM

[75] Inventor: Takeshi Fujishiro, Yokosuka, Japan

[73] Assignee: Nissan Motor Company, Limited, Yokohama, Japan

[21] Appl. No.: 50,164

[22] Filed: Jun. 20, 1979

[30] Foreign Application Priority Data

| Jun. 27, 1978 [JP] | Japan | 53-77020 |
| Aug. 10, 1978 [JP] | Japan | 53-96721 |
| Oct. 5, 1978 [JP] | Japan | 53-122025 |
| Oct. 20, 1978 [JP] | Japan | 53-128586 |

[51] Int. Cl.³ .............................................. F02B 3/00
[52] U.S. Cl. .................................... 123/478; 123/483
[58] Field of Search ............. 123/32 CA, 32 AC, 478, 123/483

[56] References Cited

U.S. PATENT DOCUMENTS

| 3,786,788 | 1/1974 | Suda | 123/32 CA |
| 3,788,285 | 1/1974 | Gelin | 123/32 CA |
| 3,817,099 | 6/1974 | Bubniak | 123/32 CA |
| 3,943,891 | 3/1976 | Kinugawa | 123/32 CA |
| 3,967,596 | 7/1976 | Comley | 123/32 CA |
| 4,121,549 | 10/1978 | Martin | 123/32 CA |

FOREIGN PATENT DOCUMENTS

| 1266803 | 3/1972 | United Kingdom . |
| 1314411 | 4/1973 | United Kingdom . |
| 1445292 | 8/1976 | United Kingdom . |
| 1471649 | 4/1977 | United Kingdom . |

Primary Examiner—Ronald B. Cox
Attorney, Agent, or Firm—Schwartz, Jeffery, Schwaab, Mack, Blumenthal & Koch

[57] ABSTRACT

A fuel injection system is disclosed for use in an internal combustion engine. The system comprises at least one fuel injection valve, a flow sensor responsive to an intake air flow for developing at its output a pulse signal having a frequency corresponding to the intake air flow, and drive means for actuating the fuel injection valve for a predetermined period of time every time a pulse signal is applied thereto from the flow sensor. The amount of fuel to be injected is controlled by the frequency of fuel injection per unit time.

12 Claims, 10 Drawing Figures

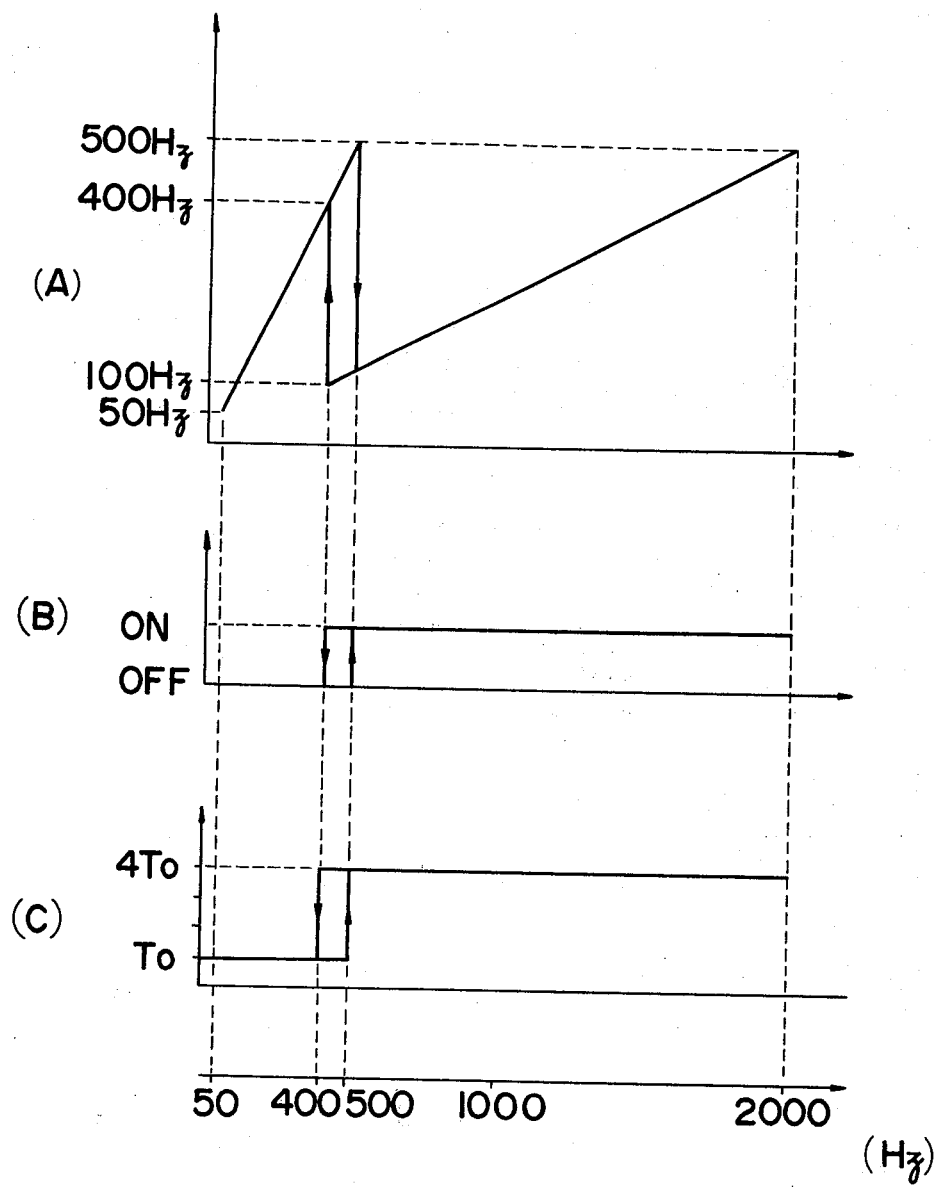

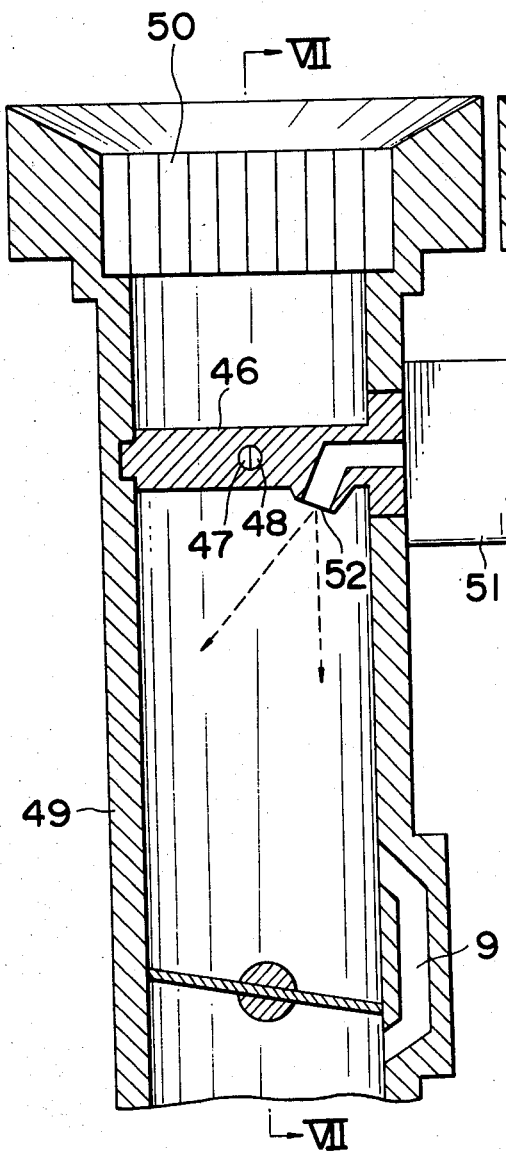
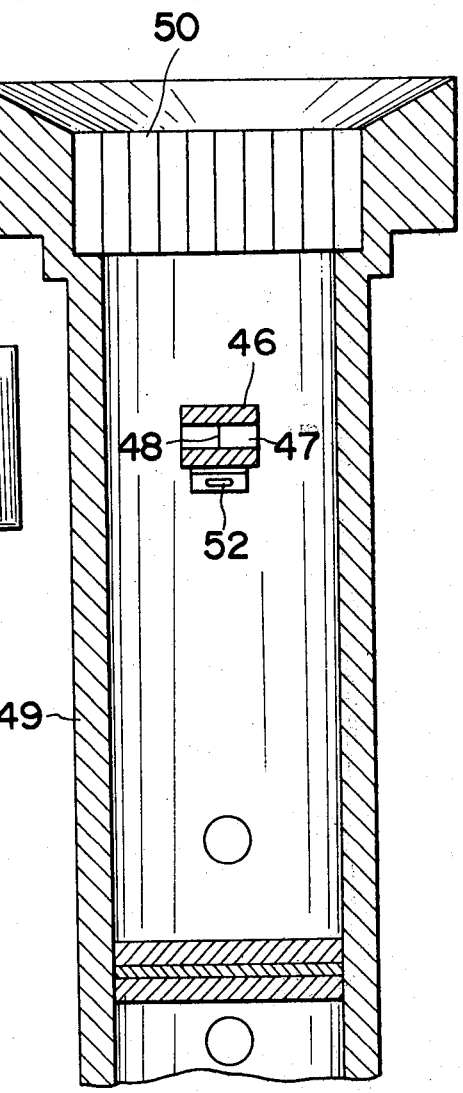

4,269,157

1

FUEL INJECTION SYSTEM

BACKGROUND OF THE INVENTION

1. Field of the Invention

This invention relates to improvements in a fuel injection system for use in an internal combustion engine.

2. Description of the Prior Art

FIG. 1 is a block diagram showing a conventional fuel injection system for use in an internal combustion engine. The system comprises an air flow sensor 1 responsive to an intake air flow for developing at its output a voltage signal Sq having a magnitude proportional to the intake air flow and a rotation sensor 2 responsive to a speed of rotation of the engine for developing at its output a voltage signal Sn having a magnitude proportional to the engine rotational speed. The signals Sq and Sn are fed to a divider 3 which develops at its output a signal Sq/Sn having a magnitude corresponding to the intake air flow per an engine rotation. The signal Sq/Sn is fed to a basic pulse generator 4 which develops at its output a basic pulse signal Sp1, the pulse width of which corresponds to the magnitude of the signal Sq/Sn. The basic pulse signal Sp1 is fed to a correction circuit 5 which corrects the pulse width of the basic pulse signal Sp1 in accordance with signals S1 to S5 fed thereto from sensors (not shown) and representing various engine operation parameters such as throttle position, water temperature, outside temperature, engine rotational speed and exhaust gas condition and develops at its output a pulse signal Sp2 having a corrected pulse width. The pulse signal Sp2 is applied to a drive circuit 6. The drive circuit 6 provides an injection pulse P1 having its pulse width determined by the pulse signal Sp2 to an electromagnetic fuel injection valve 7 every time a timing signal St1 is applied thereto in synchronism with rotation of the engine so that the fuel injection valve 7 is actuated to inject fuel for a period of time corresponding to the pulse width of the injection pulse P1.

The general principle of such a conventional fuel injection system is to effect fuel injection for each engine rotation under the control of an injection pulse, the pulse width of which is determined in accordance with the intake air flow per one engine rotation. That is, the amount of fuel to be injected is controlled in accordance with the pulse width of the injection pulse. This requires a highly precise and expensive injection valve which is operable with high responsibility to the injection pulses and also which has a large flow dynamic range such as one on the order of 10:1. Additionally, the conventional fuel injection system requires a complex control circuit which includes a divider for calculating an intake air amount per one engine rotation.

SUMMARY OF THE INVENTION

It is therefore one object of the present invention to provide an improved fuel injection system which is simple in structure and inexpensive to produce.

Another object of the present invention is to eliminate the need for any highly precise and expensive fuel injection valve.

Still another object of the present invention is to provide a fuel injection system which can produce an air/fuel mixture with high even fuel distribution and high fuel atomization.

In accordance with the present invention, these and other objects are accomplished by a fuel injection system comprising at least one fuel injection valve, a flow sensor responsive to an intake air flow for developing at its output a pulse signal having a frequency corresponding to the intake air flow, and drive means for actuating the fuel injection valve for a predetermined period of time every time a pulse signal is applied thereto from the flow sensor. The amount of fuel to be injected is controlled by the frequency of fuel injection per unit time.

Other objects, means, and advantages of the present invention will become apparent to one skilled in the art thereof from the following description.

BRIEF DESCRIPTION OF THE DRAWINGS

The following explanation of several preferred embodiments of the present invention will help in the understanding thereof, when taken in conjunction with the accompanying drawings, which, however, should not be taken as limiting the present invention in any way, but which are given for purposes of illustration only, and in which;

FIG. 4A to 4C are views used to explain the operation of the fuel injection system of FIG. 3;

FIG. 6 is a sectional view showing one form of the fuel injection valve;

FIG. 7 is a sectional view taken along the line VII—VII of FIG. 6;

DESCRIPTION OF THE PREFERRED EMBODIMENTS

Figure 1:
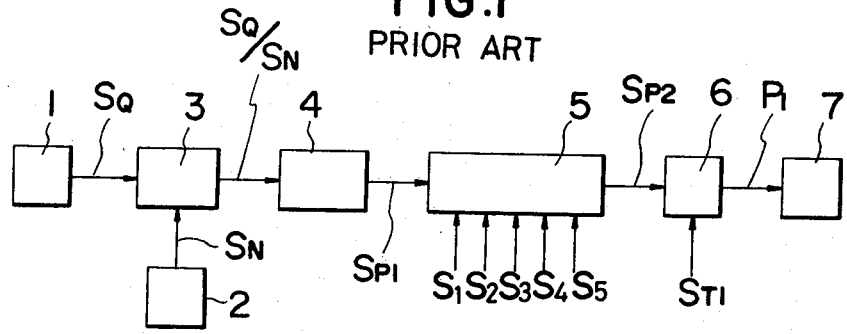
FIG. 1 is a block diagram of a conventional fuel injection system.
Figure 2:
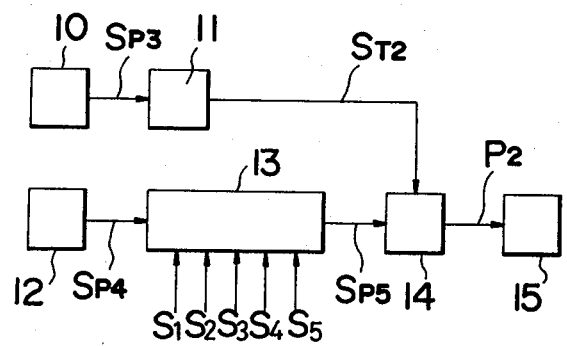
FIG. 2 is a block diagram showing a first embodiment of the fuel injection system made in accordance with the present invention.

Referring now to FIG. 2 of the drawings, there is illustrated in block diagram form a first embodiment of the fuel injection system of the present invention. The system comprises a Karman's vortex flow meter 10 disposed within the intake passage of an engine which is responsive to an intake air flow for developing at its output a pulse signal Sp3, the frequency of which is proportional to the intake air flow. The pulse signal Sp3 is fed to a frequency divider 11 which demultiplies the pulse signal Sp3 at a suitable ratio and develops a timing signal St2. Although the frequency divider 11 is required to provide high injection valve responsiveness where the frequency of the pulse signal St2 fed from the Karman's vortex flow meter 10 is very high (such as on the order of about 1 KHz at maximum engine output), it is to be noted that the frequency divider 11 may be removed if the frequency of the pulse signal Sp3 is relatively low.

The system also comprises a basic pulse generator 12 for developing at its output a basic pulse signal Sp4 having a predetermined pulse width to a correction circuit 13. The correction circuit 13 corrects the pulse width of the basic pulse signal Sp4 in accordance with signal S1 to S5 fed thereto from sensors (not shown) and representing various engine operation parameters such as throttle position, water temperature, outside temperature, engine rotation speed and exhaust gas condition and develops at its output a pulse signal Sp5 having a corrected pulse width. The pulse signal Sp5 is applied to a drive circuit 14. The drive circuit 14 provides an injection pulse P2 having its pulse width determined by the pulse signal Sp5 to an electromagnetic injection valve 15 every time the timing signal St2 is applied thereto from the frequency divider 11, whereby the injection valve 15 is actuated to inject fuel.

With the fuel injection system of this embodiment, the pulse width of the injection pulse P2 is substantially constant and the amount of fuel to be injected is controlled in accordance with the frequency of fuel injection per unit time. The maximum ratio between the pulse width of the basic pulse signal Sp4 and the pulse width of the injection pulse corrected in the correction circuit 13 in accordance with various engine operation parameters is about 2:1. Then, there is no need for any highly precise fuel injection valve which has a large flow dynamic range. Since the frequency of fuel injection is higher as compared to conventional fuel injection systems, it is possible to produce a good air/fuel mixture with high even fuel distribution and high fuel atomization.

Conventional fuel injection systems have required a fuel injection valve for each cylinder in order to achieve high fuel distribution, which results in expensive systems. The present invention accomplishes timing of fuel injection independently of rotation of the engine and increases the frequency of fuel injection per an engine rotation. This permits to supply a uniform air/fuel mixture into every cylinder with only one fuel injection valve provided in the junction of the intake manifold.

It is to be noted that the Karman's vortex flow meter 10 may be eliminated and replaced with a turbine flow meter or other suitable means responsive to intake air flow for generating a signal having a frequency corresponding to the intake air flow. In addition, a combination of an air flow sensor responsive to intake air flow for generating a voltage signal having a magnitude proportional to the intake air flow and a voltage-frequency converter for converting the voltage signal to a signal having a frequency corresponding to the air intake flow may be used instead of the Karman's vortex flow meter 10. However, the use of a Karman's vortex flow meter is more advantageous in that its output signal can be used as a timing signal directly or through a frequency divider.

Figure 3:
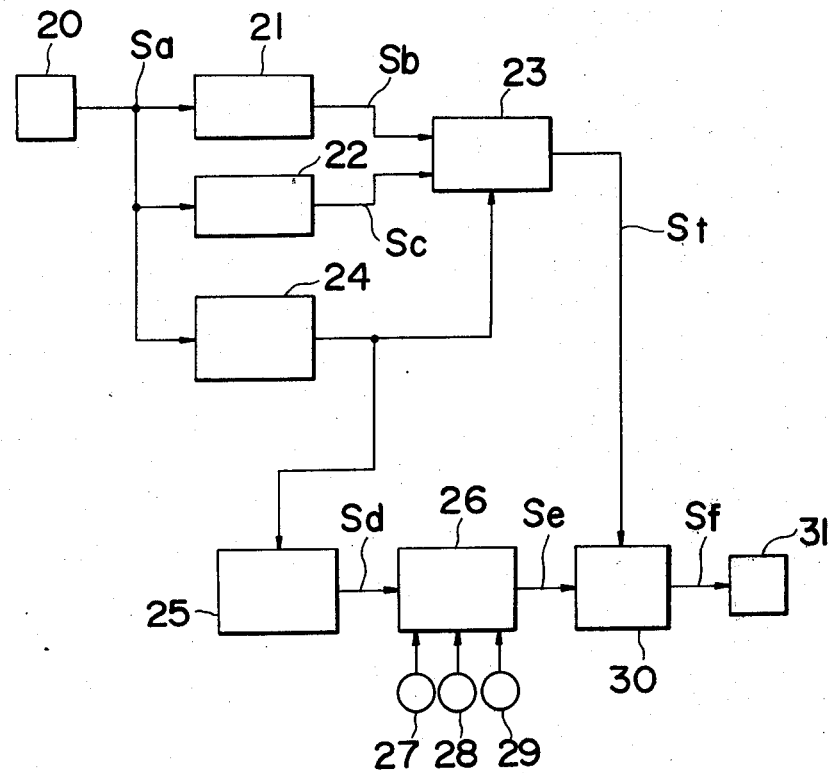
FIG. 3 is a block diagram showing a second embodiment of the present invention.

Referring to FIG. 3, there is shown a second embodiment of the present invention. The fuel injection system of this embodiment comprises a Karman's vortex flow meter 20 disposed within an engine intake system for providing a pulse signal Sa, the frequency of which is proportional to an intake air flow. For example, the flow meter 20 develops a signal with a frequency of 50 Hz at minimum intake air flow and a signal with a frequency of 1,000 Hz at maximum intake air flow.

The signal Sa is fed to first and second frequency dividers 21 and 22 which divide the frequency of the signal Sa at division ratios of 1 and 4, respectively, and provides output signals Sb and Sc to a switching circuit 23. The signal Sa is also fed to a frequency comparator 24 which compares the frequency of the signal Sa with a reference value. In view of control stability, it is preferable to set the reference value hysteretically such that the frequency of the signal Sa is compared with a higher reference value when it varies to increase and with a lower reference value when it varies to decrease as shown in FIG. 4B. For example, the comparator 24 turns on when the frequency of the signal Sa from the Karman's vortex flow meter varies to increase over 500 Hz and turns off when the frequency of the signal Sa varies to decrease below 400 Hz.

The switching circuit 23 allows passage of the signal Sc fed from the second frequency divider 22 when the frequency comparator 24 is on and allows passage of the signal Sb fed from the first frequency divider 21 when the frequency comparator 24 is off.

The fuel injection system also comprises a basic pulse generator 25 which has an input from the frequency comparator 24 for developing at its output a basic pulse signal Sd. The pulse width of the basic pulse signal Sd developed when the frequency comparator 24 is on is four times (corresponding to the division ratio of the second frequency divider 22) the pulse width of the basic pulse signal Sd developed when the frequency comparator 24 is off. The basic pulse signal Sd is fed to a correction circuit 26 which corrects the pulse width of the basic pulse signal Sd in accordance with various engine operation parameters represented by signals fed from a water temperature sensor 27, atmospheric pressure sensor 28 and exhaust gas condition sensor 29 and develops at its output a pulse signal Se having a corrected pulse width. The pulse signal Se is applied to a drive circuit 30. The drive circuit 30 provides an injection pulse signal Sf having its pulse width determined by the pulse signal Se to an electromagnetic fuel injection valve 31 every time a timing signal St is applied thereto from the switching circuit 23, thereby actuating the fuel injection valve 31 for a period of time corresponding to the pulse width of the pulse signal Sf. The timing signal St is the signal Sc when the frequency comparator 24 is on or the signal Sb when the frequency comparator 24 is off.

FIG. 4A is a diagram of flow meter output frequency versus timing pulse frequency showing the characteristics of the timing pulse signal St, FIG. 4B is a diagram showing the output characteristic of the frequency comparator 24, and FIG. 4C is a diagram of flow meter output frequency versus basic signal pulse width showing the characteristics of the basic pulse signal generator 25. It can be seen in FIGS. 4A to 4C that the pulse signal Sa developed by the flow meter 20 is directly applied to the drive circuit 30 to accomplish timing of fuel injection when its frequency is low under low intake air flow conditions. Thus, the fuel injection timing is 50 Hz a minimum intake air flow. This provides good air-fuel mixing condition and distribution. On the other hand, when the frequency of the pulse signal Sa developed by the flow meter 20 increases above 500 Hz as the intake air flow increases, the pulse signal Sc fed from the second frequency divider 22 is applied to the drive circuit 30 to accomplish timing of fuel injection and also the pulse width of the basic pulse signal Sd changes to a value four times that of the basic pulse signal Sd when the frequency of the pulse signal Sa is below 500 Hz. Since the fuel injection timing is 500 Hz at maximum intake air flow, there is no need for any high speed fuel injection valve.

Since the intake air flow varies by a factor of ten due to changes in engine rotational speed from about 600 rpm (during idling) to about 6,000 rpm (at maximum engine output) and additionally varies by a factor of about four due to changes in engine load condition, it varies in all by a factor of about 40 from its minimum value to its maximum value. Thus, it is required to vary the amount of fuel to be injected by a factor of about 40 from its minimum value to its maximum value. Limitation on the range of variability of the fuel injection amount due to the structure of the fuel injection valve results in poor air-fuel mixing condition and distribution. The fuel injection system in this embodiment eliminates such a possibility by increasing the frequency of fuel injection and decreasing the amount of fuel to be injected for each injection of fuel under low intake air flow conditions, while decreasing the frequency of fuel injection and increasing the amount of fuel to be injected for each injection of fuel under high intake air flow conditions.

Figure 5:
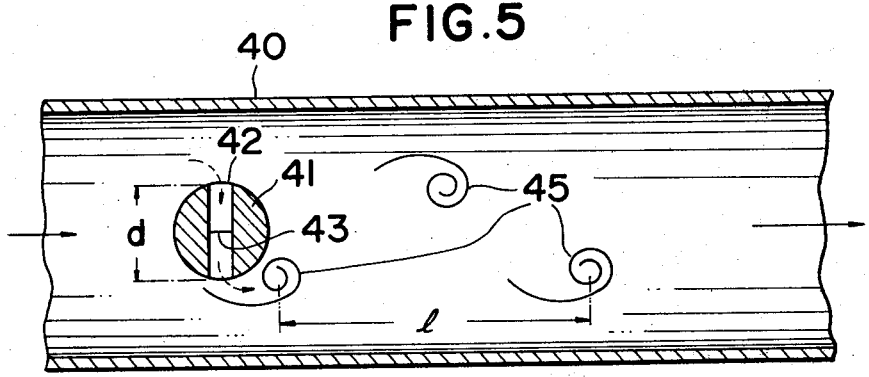
FIG. 5 is a sectional view used to explain the principle of a Karman's vortex flow meter.

Referring to FIG. 5, the Karman's vortex flow meter will now be described in greater detail. Karman's vortex flow meters utilize the fact that the frequency at which Karman's vortexes are generated by a columnar object disposed in fluid flow is proportional to the velocity of the flowing fluid.

Within a fluid passage 40 there is provided a typical Karman's vortex flow meter which comprises a cylindrical vortex generator 41 formed with a through-hole 42 and hot wire 43 extending within the through hole 42. Fluid flow occurs through the through-hole 42 to cause a change in resistance of the hot wire 43 every time a Karman's vortex is created. The frequency or period at which Karman's vortexes are generated is detected and the fluid flow is measured in accordance with the resistance change.

Since strong vortexes are generated by the vortex generator 41 to strongly stir the fluid downstream of the vortex generator 41, air and fuel will be fully mixed if fuel is injected into fluid passage 40 downstream of the vortex generator 41. Since the generated vortexes are weakened as they travel away from the vortex generator 41, the injection nozzle of a fuel injection valve is preferable disposed as near the vortex generator as possible. A sufficient stirring effect can be obtained if the injection nozzle is disposed spaced downstream from the vortex generator 41 a distance shorter than the distance l between a vortex just generated and the preceding one. Experiments show that the distance l is about 4.63d where d is the diameter of the cylindrical vortex generator 41. For example, if the diameter of the vortex generator is 2 cm, the injection nozzle of the fuel injection valve may be disposed at a location spaced within about 9 cm downstream of the vortex generator 41. Substantially the same value was obtained with vortex generators with square or triangular cross section.

FIGS. 6 and 7 illustrate a novel relationship between a Karman's vortex flow meter and a fuel injection valve on the basis of the above considerations. The Karman's vortex flow meter comprises a vortex generator 46 formed with a through-hole 47 and a hot wire 48 extending within the through-hole 47. The flow meter is disposed within an intake passage 49 which is connected at its upstream side through a honeycomb flow regulator 50 to an air cleaner (not shown) and connected at its downstream side through an intake manifold to the intake ports of cylinders.

The fuel injection valve 51 has its injection nozzle 52 extending through the vortex generator 46 and opening at the downstream side of the vortex generator 46 so that fuel can be injected as indicated by the broken line arrows. Since the flow downstream of the vortex generator 46 is stirred strongly by generated Karman's vortexes, the injected fuel is fully mixed with air introduced thereinto. This results in an air/fuel mixture with high even fuel distribution and high fuel atomization.

Although it is preferable to continuously inject fuel in order to provide high atomization and distribution effect, sufficient results can be obtained by injecting fuel in synchronism with rotation of the engine or generation of Karman's vortexes; that is, in synchronism with the output signal of the Karman's vortex flow meter.

Figure 8:
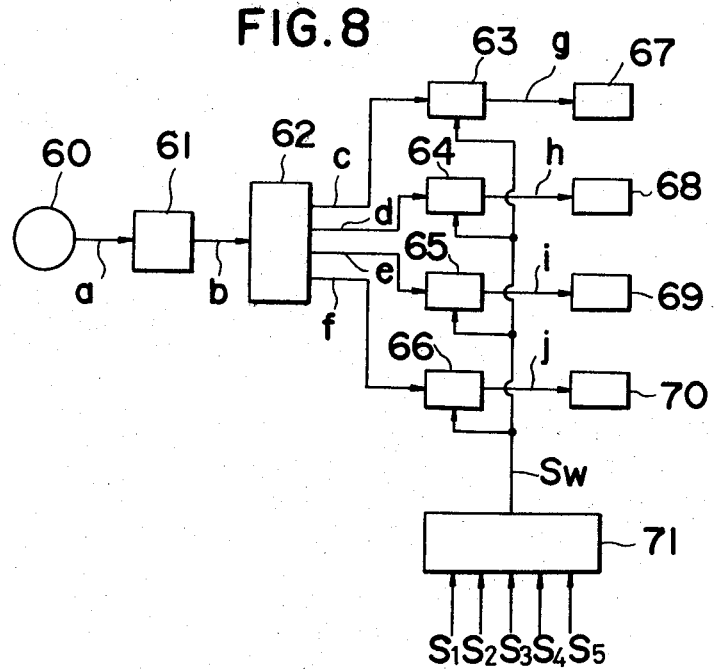
FIG. 8 is a block diagram showing a third embodiment of the present invention.

Referring to FIG. 8, there is illustrated in block diagram form a third embodiment of the present invention. The fuel injection system of FIG. 8 comprises a Karman's vortex flow meter 60 responsive to an intake air flow for developing at its output pulse signal a, the frequency of which is proportional to the intake air flow. The signal a is fed to a waveform shaper 61 which shapes the waveform of the signal a and develops at its output a pulse signal b. The pulse signal b is applied to a signal distributor 62 which is responsive to the signal b for providing trigger signals c, d, e and f to monostable multivibrators 63 to 66, respectively. Each of the monostable multivibrators 63 to 66 is triggered by a trigger signal fed from the signal distributor 62 for developing at its output an injection signal g, h, i or j having a predetermined pulse width so as to actuate corresponding one of fuel injection valves 67 to 70 which is held open while the injection signal is applied thereto.

The system also comprises a correction circuit 71 which is responsive to signals S1 to S5 fed from sensors (not shown) representing various engine operation parameters such as throttle position, water temperature, outside temperature, engine rotational speed and exhaust gas conditions for providing a correction signal Sw to the monostable multivibrators 67 to 70 thereby correcting the pulse width of the injection signals g to j in accordance with the engine operation parameters.

With the fuel injection system of this embodiment, the pulse width of the injection pulses g to j is sustantially constant and the amount of fuel to be supplied from each fuel injection valve is controlled in accordance with the frequency of fuel injection per unit time.

Figure 9:
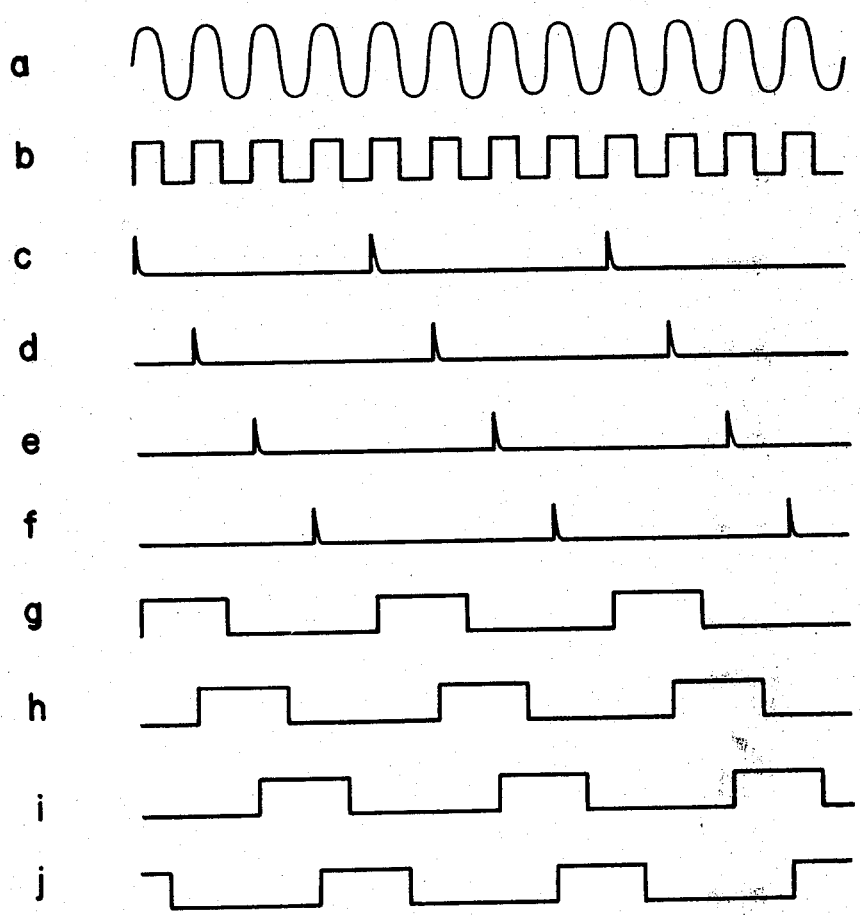
FIG. 9 is a voltage waveform timing diagram used to explain the operation of the fuel injection system of FIG. 8.

FIG. 9 is a voltage waveform timing diagram showing the signals a to j and their timed relationship developed on the lines designated by the same letter in the system of FIG. 8. It can be seen in FIG. 9 that the periods of time in which the fuel injection valves 67 to 70 inject fuel can be overlapped. Thus, it is possible to increase by a factor of four the range within which the amount of fuel to be injected varies as compared to the case where one fuel injection valve only is used. Consequently, a sufficient amount of fuel can easily be supplied to the engine. For example, assuming that the pulse width of each injection signal is 3 msec and the interval of fuel injections is 40 msec (for a fuel injection frequency of 25 Hz) during idling where the intake air flow is 2 l/sec, an amount of fuel 40 times the amount of fuel injected during idling can be supplied at maximum engine output where the intake air flow is 100 l/sec by decreasing the fuel injection interval to 1 msec (thereby increasing injection frequency to 1 KHz), with each injection signal pulse width held at 3 msec so as to overlap the periods of time in which the four fuel injection valves operate.

Figure 10:
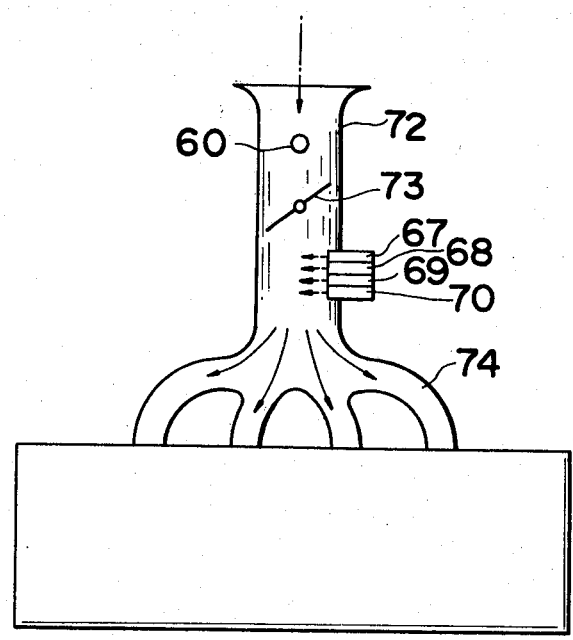
FIG. 10 is a schematic view showing the position of the fuel injection valves used in the fuel injection system of FIG. 8.

FIG. 10 shows the fuel injection system of FIG. 8 as incorporated in an internal combustion engine. The Karman's vortex flow meter 60 is disposed within an intake passage 72 at a location upstream of a throttle valve 73. An assembly of the fuel injection valves 67 to 70 is fitted in the intake passage 72 at a location downstream the throttle valve 73 and near an intake manifold 74 so that a uniform air/fuel mixture can be supplied into every cylinder. The dot-dash line arrow indicates intake air flow, the broken line arrows injected fuel, and the solid line arrows air/fuel mixture flow.

A plurality of fuel injection valves is controlled such that the periods of time in which the fuel injection valves inject fuel are overlapped and such that the amount of fuel to be injected therethrough depends on the frequency of fuel injection per unit time. This provides a wide range of variation of the amount of fuel to be injected, resulting in high fuel atomization and high even fuel distribution.

While the present invention has been shown and described with reference to some preferred embodiments thereof, and with reference to the drawings, it should be understood that various changes and modifications may be made to the form and the detail thereof, by one skilled in the art, without departing from the scope of the present invention. Therefore, it should be understood by all those whom it may concern that the shown embodiments, and the drawings, have been given for the purposes of illustration only, and are not intended to limit the scope of the present inventive protection sought to be granted by Letters Patent, which are solely to be defined by the accompanying claims.

What is claimed is:

1. A fuel injection system for use in an internal combustion engine having an intake passage, comprising:
    (a) at least one fuel injection valve for supplying fuel to said engine when said fuel injection valve is open;
    (b) an air flow sensor disposed within said intake passage for generating a pulse signal at a frequency proportional to air flow through said intake passage;
    (c) frequency comparator means responsive to said pulse signal for generating a first output signal when the frequency of the pulse signal is less than a reference frequency and a second output signal when the frequency of the pulse signal is greater than the reference frequency;
    (d) control circuit means operatively coupled to said air flow sensor and said frequency comparator means for passing the pulse signal in response to said first output signal, and for dividing the frequency of said pulse signal at a predetermined division ratio and passing the frequency-divided pulse signal in response to said second output signal;
    (e) pulse generator means responsive to said first output signal for generating a pulse signal having pulses of a first pulse width and responsive to said second output signal for generating a basic pulse signal having pulses of a second pulse width equal to the multiplication of the first pulse width by said division ratio; and
    (f) drive circuit means operatively coupled to said control circuit means and said pulse generator means for opening said fuel injection valve for a time determined by the pulse width of a pulse from said pulse generator means in response to each pulse signal from said control circuit means.

2. A fuel injection system according to claim 1, wherein said flow sensor comprises a Karman's vortex flow meter.

3. A fuel injection system according to claim 2, wherein said Karman's vortex flow meter includes a vortex generator, and wherein said fuel injection valve includes a fuel nozzle opening disposed at a location downstream of said vortex generator.

4. A fuel injection system according to claim 3, wherein said location of said fuel nozzle opening is spaced at a distance downstream of said vortex generator, said distance being less than the distance between successively generated vortexes, whereby fuel injected is mixed by said vortexes with air flowing through said intake passage.

5. A fuel injection system according to claim 4, wherein said vortex generator comprises a cylinder having a diameter d and said fuel nozzle opening is spaced at a distance less than 1 downstream of said vortex generator, where 1 is about 4.63d.

6. A fuel injection system according to claim 1, wherein said flow sensor comprises a turbine flow meter.

7. A fuel injection system according to claim 1, further comprising a correction circuit operatively coupled for correcting said time for which said injection valve is opened, in dependance on various engine operation parameters.

8. A fuel injection system according to claim 1, wherein said frequency comparator means is operative for comparing said airflow sensor pulse signal hysteretically with a lower reference frequency when the frequency of said airflow sensor pulse signal is decreasing and with a higher reference frequency when the frequency of said airflow sensor pulse signal is increasing.

9. A fuel injection system for use in an internal combustion engine having a plurality of cylinders, an intake manifold, and an air induction passage communicating with said cylinders through said intake manifold, comprising:
    (a) a fuel injector disposed at an entrance of said intake manifold and including a plurality of fuel injection valves, each said fuel injection valve when open supplying fuel to said engine,
    (b) an airflow meter disposed within said intake passage for generating a pulse signal at a frequency proportional to airflow through said intake passage;
    (c) a plurality of pulse generators, each said pulse generator operatively coupled for providing in response to a trigger signal an injection pulse signal of predetermined pulse width for opening a corresponding one of said fuel injection valves; and
    (d) a pulse distributor responsive to said airflow meter pulse signal for providing a trigger signal to each said pulse generator in a rotational sequence, wherein the period of injection of fuel from said fuel injector is controlled in accordance with the flow of air to said engine, and wherein the duration of opening of some of said fuel injection valves overlaps.

10. A fuel injection system according to claim 9, wherein said airflow meter comprises a Karman's vortex flow meter.

11. A fuel injection system according to claim 9, wherein said airflow meter comprises a turbine flow meter.

12. A fuel injection system according to claim 9, wherein said fuel injection valves are opened for a time dependent on the width of said injection pulses, further comprising a correction circuit operatively coupled for correcting the width of said injection pulses in dependence on various engine operation parameters.

* * * * *